United States Patent
DeMent

[15] 3,646,471
[45] Feb. 29, 1972

[54] A CYLINDRICAL ARRAY OF EXPLODING CONDUCTORS EMBEDDED IN A SOLID DIELECTRIC FOR PUMPING A LASER

[72] Inventor: Jack DeMent, 4847 Southeast Division Street, Portland, Oreg. 97206

[22] Filed: Nov. 25, 1966

[21] Appl. No.: 597,505

Related U.S. Application Data

[62] Division of Ser. No. 254,536, Jan. 7, 1963, Pat. No. 3,300,734.

[52] U.S. Cl. ............................................. 331/94.5, 431/97
[51] Int. Cl. .......................................................... H01s 3/09
[58] Field of Search ................. 331/94.5; 240/1; 431/92, 97, 431/98, 99; 317/80; 102/28 EB; 313/53

[56] References Cited

UNITED STATES PATENTS

| 1,274,009 | 7/1918 | Courtier | 431/99 |
| 3,262,070 | 7/1966 | Reuter et al. | 331/94.5 |
| 3,262,071 | 7/1966 | Reuter et al. | 331/94.5 |

*Primary Examiner*—Ronald L. Wibert
*Assistant Examiner*—Edward Bauer

[57] ABSTRACT

A rotatable phased array of explodable conductors is enstructured with a transparent cylinder of dielectric, blast-resistant solid, each of the explodable conductors fired in sequence by contact with a high-voltage source upon rotation of the cylindrical ensemble of explodable conductors, to sequentially release brilliant bursts of light including laser pumping light.

2 Claims, 16 Drawing Figures

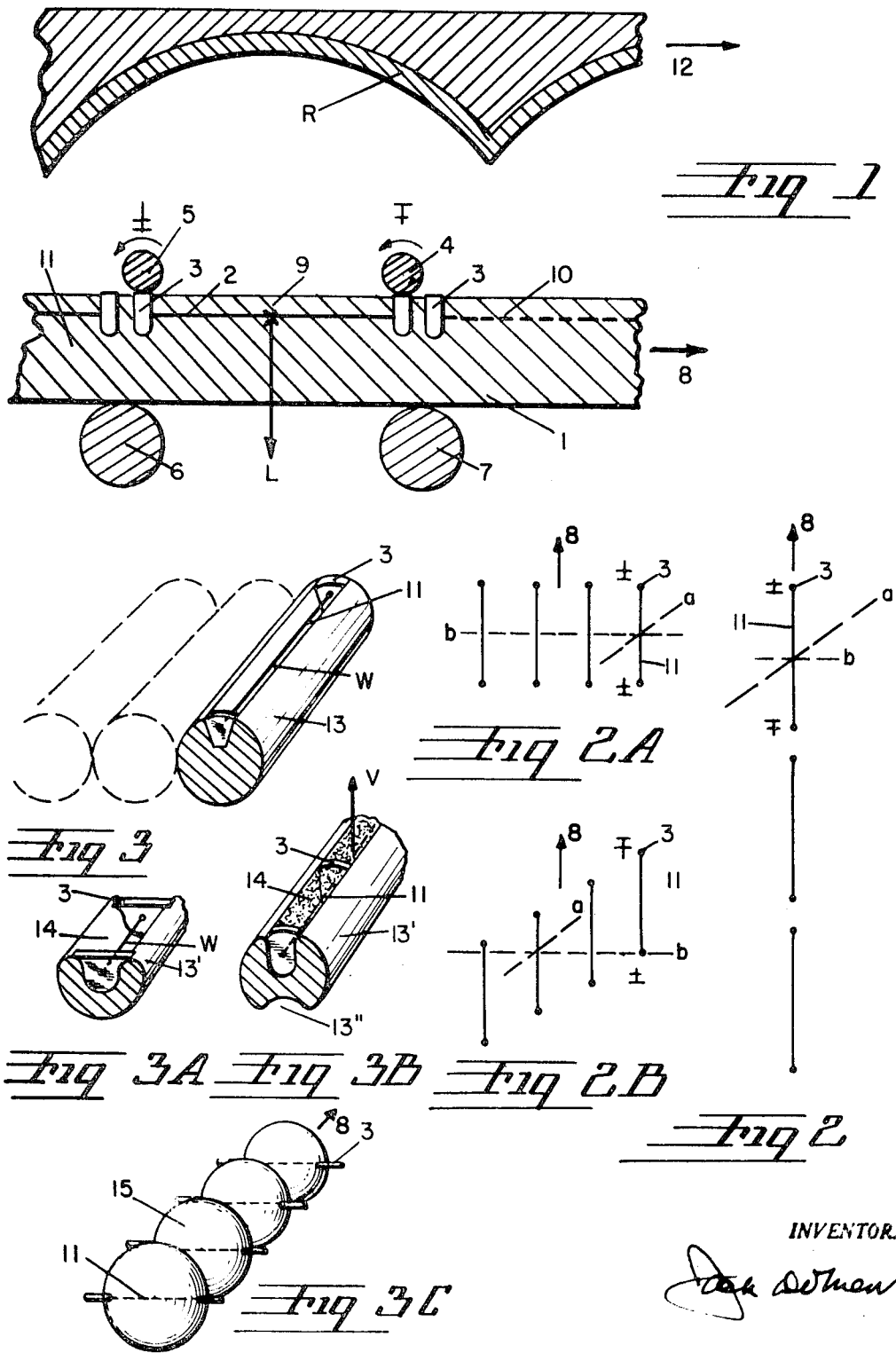

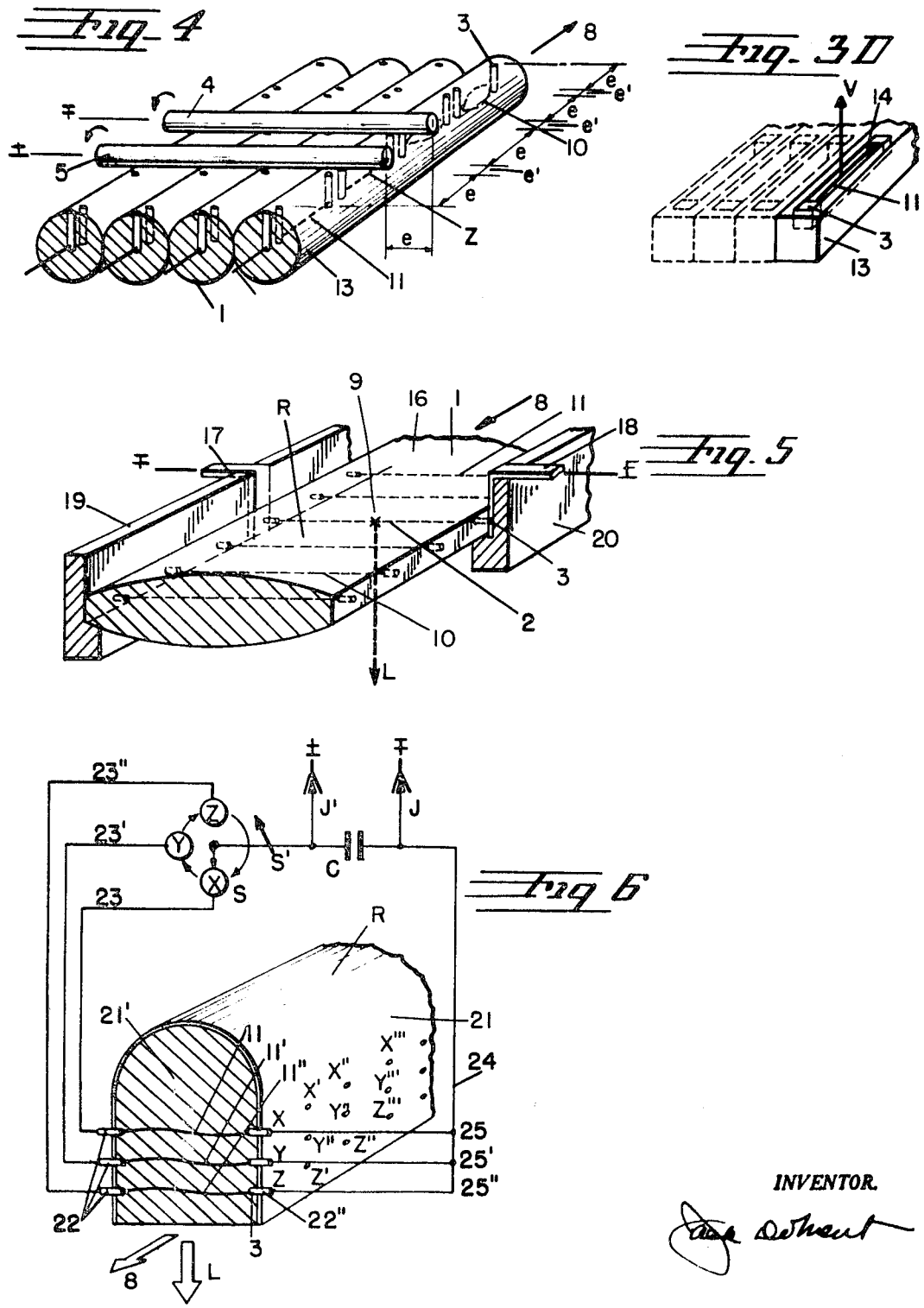

PATENTED FEB 29 1972 3,646,471

INVENTOR.

3,646,471

CYLINDRICAL ARRAY OF EXPLODING CONDUCTORS EMBEDDED IN A SOLID DIELECTRIC FOR PUMPING A LASER

This invention is a division of U.S. Ser. No. 254,536, filed Jan. 7, 1963, now U.S. Pat. No. 3,300,734, granted Jan. 24, 1967.

This invention relates to a superintensity light source and to a laser (or optical maser) light wave generator. In particular, to an improvement in the art of electrically explodable conductors characterized as releasing large amounts of ultraviolet, visible and infrared radiations which are generated by methods and means hereinafter disclosed. In certain ultrahigh energy versions of this invention X-rays and Grenz rays are also produced.

Furthermore, this invention relates to lasing methods and means characterized by light emissions in the ultraviolet, visible and infrared portions of the electromagnetic wave spectrum having power, coherence, monochromaticity, directionality and frequency attributes over and above the so-called incoherent sources of light.

For purposes of this invention and its disclosure and appended claims, as will be explained in detail subsequently, when I employ the term "explosion" or the like I do not exclude "implosion" or the like.

It is among the objects of this invention to provide for an irradiable target methods and means for the generation of superintensity electromagnetic waves characterized as lying in the ultraviolet, visible and infrared portions of the spectrum.

It is an object of this invention to provide an exploding conductor light wave generator characterized by a moving explodable conductor enstructured by shock constraining elements; furthermore, a moving explodable conductor characterized as passing into the field of an irradiable target, where it released light energy, and passing out of that field in such manner and at such velocity that the target field is spared exposure to shock energy created by the explosion of the conductor.

It is an object of this invention to provide method and means for separating the light energy from the shock energy produced in a conductor explosion by moving an explodable conductor at such a rate in such a manner that the velocity difference between electromagnetic energy and shock energy is taken advantage of; that is, an explodable conductor is moved past an irradiable target at a rate which allows that target to be irradiated by light waves but not by shock waves because of the lower velocity of the latter.

It is another object of this invention to provide methods and means for the electrical explosion of a phased array of explodable conductors, and to the electrical explosion of a phased array of exploadable conductors wherein the array is made up of different conductor materials so as to provide light emissions of different spectral qualities and quantities.

It is also an object of this invention to provide a laser or optical maser light generator and lasing system, including: the high energy pumping of a laser resonator or a phased array of resonators with light energy derived from a succession of conductor explosions; pumping of a laser resonator or an array of resonators with minimal shock insult to the resonator system by virtue of shock constrainment and/or "velocity sieving," as just mentioned and as discussed in detail hereinafter; the spectral matching of laser pumping frequencies with laser active species excitation frequencies; and the like.

It is among the objects of this invention to provide a superintensity light wave generator characterized as emitting in the ultraviolet, visible and infrared portions of the electromagnetic spectrum in combination with lasing methods and means for such applications as the following;

Research and technology in such variegated areas as specialty and high speed and micro photography, including wind and shock tunnel and schlieren investigations; irradiable target exposure and substance irradiation, including flash photolysis, atomic absorption analysis, fluorescence and phosphorescence excitation; interferometry and optical design;

Photomaching, photobending, photowelding of metals and various inorganics;

Medical and bioscience problems, including photocoagulation, photocauterization, photomicrosurgery, diagnostics, ophthalmologic surgery, cerebral cortex surgery, and the like;

Signaling, communication, range finding and optical radars, including problems involving the transmission of computer data in outer space, geodesy and surveying, data display, and specialty intelligence devices including optical computers;

other objects and features of my invention are particularly pointed out and described hereinafter.

It is a feature of my invention that shock energy is parted by constrainment from electromagnetic light energy in the course of an electrically induced explosion of a conductor such as a wire, cylinder, film or foil. Furthermore, the light burst may be obtained at a controllable and phased sequence rate, from ultraslow to ultrafast, depending upon the particular embodiment of this invention and the rate at which electrical energy is deposited into an explodable conductor member. The light burst is controllable in quality, as in spectral characteristics by choice of the explodable conductor or combinations thereof. Moreover, the light burst is controllable in quantity, as by the time integral of intensity.

It is another feature of this invention to provide a dynamic as contrasted to present art wholly static exploding conductor system. For example, in the present improvement the explodable conductor is set into motion with numerous advantages and novel benefits and results. Among these is the attainment of conductor explosion rates not now feasible with present static explodable conductor assemblies. Also, by moving the conductor into and out of the target field the target is better assured protection from shock insult. A broadly novel feature, which I call "velocity sieving," takes advantage of the fact that the velocity of electromagnetic radiation such as light waves exceeds shock and like energy velocities by a factor of approximately $4-8\times 10^5$. In velocity sieving, I move or displace the explodable conductor in such a fashion that it is passed into the target field to release its virtually instantaneous burst of light, and is then passed out of the target field before the release of the much lower velocity shock energy.

A feature of this invention is that in certain embodiments it comprises a portable explodable conductor system, i.e., a system whereby the explodable conductor and immediate ancillary members can be detached from the primary electrical feed system. Likewise, this invention is adapted to a wide range in size and energy modifications, as dictated by end-use requirements.

And a feature of this invention is the operancy of an explodable conductor system over a wide range of temperatures and pressure, within hostile environments, e.g., corrosive atmospheres, in vacuums, and cooperantly with various optical trains.

It is known that if there is applied to an electrical conductor such as a thin wire a large amount of electrical energy that wire will explode with the release of a very large amount of light. The same is true of conductors of other geometries, as for example foils and films. If a hollow tube or cylinder or like geometry conductor is the depository of sufficient electrical energy an "implosion," as contrasted to an "explosion," will take place. That is, instead of an outwardly expanding release of shock and like energy an inwardly collapsing release of shock and like energy characterizes the energy transduction profile. It is known that conductor explosions and conductor implosions have certain common qualities and similarities. Therefore, when I use the term "explosion" herein I do not exclude what is embraced in the term "implosion" and vice versa unless a specific and special distinction is made in a particular instance. It is characteristic of the present state of the art and physics discipline that the two are usually treated together. For the aid of those skilled in the art reference can be made to "Exploding Wires," Vols. I and II, edited by Wm. G. Chace and H. K. Moore (Plenum Press, New York, 1959 and 1962, respectively).

Suffice to state that the art is presently in a fluid state and that no single model accounts for all of the phenomena involved in what has been termed the "exploding wire phenomenon," but which is better termed the "exploding conductor phenomenon." The exploding conductor can be looked upon as a black-body:

$$(d/dt)(M\ C_v(T)\ T) = P - \sigma A T^4 - (dE/dt) \ldots \text{HYDRODYNAMIC}$$

where M is the mass of the explodable conductor such as wire or film; $C_v(T)$ is the specific heat at constant volume; T is the wire temperature in °K.; P is the electrical energy deposited in the conductor in watts; $\sigma$ is the Stefan-Boltzman constant; and A is the area of the exploding conductor. When the conductor is heated very quickly the hydrodynamic loss is negligible. Since the temperature is proportional to the fourth root of the input power divided by the surface area conductors is preferred in most instances. If the radiated power is equated with the electrical power, the relationships become:

$$T = (P/\sigma A)^{1/4} = (I^2 R/\sigma A)^{1/4}$$

where T is the temperature: I is the current: and R is the resistance; therefore:

$$T^4 \sigma I^2$$

It will be noted that these relationships do not always hold, as for example in the ultrahigh energy, ultrashort time domain of the exploding conductor phenomenon which, although known for many years, has received serious theoretical and investigational attention only during the last decade, with many puzzling and unexplained facets turning up with each research. Compounded with this is the fact that even within the more conventional temperatures delimited by hot bodies and usually explained in terms of black-body relationships certain substances, called candoluminescent solids, depart markedly from black-body laws; here, the candoluminescent solids can comprise a part of the light-emitting explodable conductor or be an ancillary element, although these substances are not "conductors" or "explodable" in the usual sense of the word, just as they are not true "black-bodies." Furthermore, candoluminescent solids are generally cathodoluminescent, in which case the energies of explosion produced electrons are transduced into useful electromagnetic frequencies.

The present invention and its various features and embodiments will be better understood from the following more detailed discussion taken in conjunction with the accompanying drawings, wherein:

FIG. 1 shows in side elevation certain basic features of my invention, including an explodable conductor 9 enstructured by a moving, transparent, dielectric body member 1 together with conductor firing lead members 4 and 5.

FIGS. 2, 2A and 2B illustrate various phased array explodable conductor arrangements.

FIGS. 3, 3A, 3B, 3C and 3D show in perspective examples of explodable conductor and enstructuring member arrangements;

FIG. 4 shows in perspective a form of this invention taken from FIG. 1 and FIG. 3–3C;

FIG. 5 shows in perspective another form of the explodable conductor system;

FIG. 6 represents yet another explodable conductor system, with a phased array of conductors.

Figure 7:
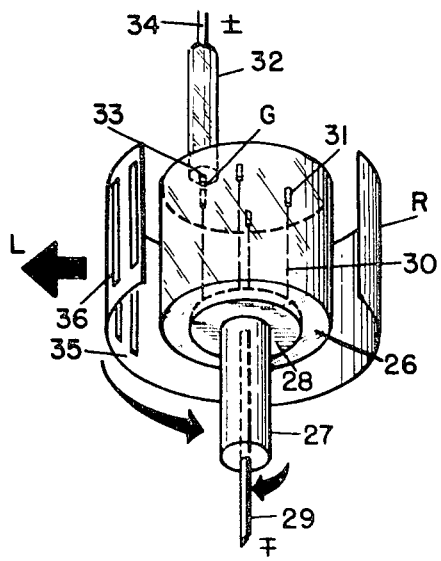
FIG. 7 illustrates in perspective a form of this invention having a phased array of explodable conductors carried within a cylindroid body member.

The accompanying drawings in more detail:

In FIG. 1 there is shown in side elevation certain of the basic and salient features of this invention. Thus: 1 is a movable body member comprising transparent dielectric solid which carries enstructured therein an explodable conductor 2, such as a wire or foil, the ends of which are connected to contact electrodes 3, these rising to the surface of body 1 and being adapted to close circuit with electrical firing lead or contact members 4 and 5. Members 4 and 5 may be spaced so as to close circuit with electrodes 3, and as shown in FIG. 1 are rollable or otherwise movable adjustable to cooperate with the motion 8, described in detail below, of matrix 1. Support members 6 and 7 are shown on the underside of the member 1. When electrical energy is communicated via 4 and 5 it passes through electrodes 3 and is deposited in conductor 2, to initiate an explosion (and/or implosion, as the case may be) represented by 9, with the release of an intense burst of light L. Since the body 1 moves between 4 and 5, upon members such as 6 and 7, a series of conductors are exploded in sequence, 10 representing an exploded conductor and 11 representing an unexploded conductor. In order to conserve and reuse the light emitted in directions other than L a reflector member R is appropriately placed above the exploding conductor assembly between 4 and 5 or as exemplified by point 9: since in some modifications of this invention the shock energy may be partly dissipated by venting in a direction other than that of the path of the light L, an additional function of the reflector R can be to act as a means for catching and removing the vented debris of 1. As desired, the member R can be made to move either linearly or rotationally, so that successive reflectors and/or "cowcatchers" are brought into a receiving position.

In FIG. 1 the arrow 8 is taken to represent linear motion or circular motion. When the motion is linear, then the enstructured conductor is, for example, a belt or cylinder or a projectile. When the motion is circular, i.e., at right angles to the plane of the paper, then the body member 1 is, for example, a spinning disk or whirling ring or annulus. Thus, when 1 is a belt or cylinder of substantial length (either rigid or flexible) it passes linearly through 4 and 5 together with supports 6 and 7 (which may also comprises means for moving member 1, as when 6 and 7 are rollers, wheels or toothed wheels); the same is the case when member 1 is flexible, as in the feeding from a rolled supply of 1 carrying a series of conductors (after the manner of motion picture film being fed from and taken up by spools). With flexible belts, as desired, these may be of the endless variety, carrying a predetermined number of conductors.

When member 1 and its enstructured conductor and electrodes is in disk form, it may be spun by a center affixing axel or by toothed wheels engaging the edge. While I have shown the positioning of the conductor 2 as parallel to the long axis of body member 1, I point out that this positioning is not limiting in this invention; thus, the conductor 2 may be enstructured at any desired angle, including 90° to the long axis of 1, in any suitable combination of angles. FIG. 2, 2A and 2B are intended to illustrate conductors in various phased arrays.

I point out that the electrical energy may be deposited via the electrical firing leads into the conductor via the contact electrodes in more than one way. While I have shown actual physical contact in FIG. 1, as by roller electrodes, other kinds of contact electrodes can be used, including blunt-end double needle type, roller balls, disks, and flexible blade or swiper type. All firing leads corresponding to 4 and 5 in FIG. 1 which involve physical contact are generally best adapted to body 1 motion or displacement at low speeds. For high speeds and high voltages a "no-contact" firing lead arrangement is preferred. This is simply a spark gap of minimal distance which allows sparkover passage of the electrical energy into the contact electrodes 3.

In FIGS. 2, 2A and 2B there is illustrated explodable conductors in several of the more simple phased arrays that are feasible in the various forms and embodiments of my invention, to be taken in conjunction with the other drawings herein. In FIG. 2 the explodable conductors 11 and contact electrodes 3 are depicted spaced from one another, as in FIG. 1, in linear array and in linear alignment at the intersect of $a$ and $b$, and therefore all lying in the same plane, and moving in the direction 8. FIG. 2A shows a side-by-side array of conductors, with spatial array otherwise that of FIG. 2. FIG. 2B shows a side-by-side but offset array of conductors, with spatial array otherwise that of FIG. 2. These figures exemplify various planar arrangements of a plurality of conductors, for the purpose of emphasizing the variegated conductor arrays that can be used in this invention, so that explosion rates can be increased or decreased without changing the rate of displacement in direction 8. It is evident, in addition, that indepth or three-dimensional phased arrays can be made, as for example shown in a subsequent drawing (FIG. 6). It is also evident that the phased arrays shown here apply both to linear motion and to rotational motion of 8. In the case of the latter 8 is taken as a portion of an arc; thus, the conductors can be enstructured in a spinning disk and arranged parallel to the surface of the disk as an outwinding spiral or as concentric circles; or, at right angles to the surface of the disk; furthermore, in the case of a spinning cylinder or polygon having enstructured conductors these conductors can lie parallel to the long axis of the cylinder or at right angles thereto; numerous other phased arrays are feasible and can be chosen according to the form this invention takes for a particular application.

Examples of enstructured conductor assemblies are shown in FIGS. 3, 3A, 3B, 3C and 3D. In FIG. 3 there is shown a solid cylindrical matrix body member 13 having positioned therein an explodable conductor 11 with its ancillary contact electrodes 3. Member 13 may be of high-strength, fiber-reinforced plastic or of high-strength ceramic, in which instance a sealed in transparent, dielectric solid such as glass, plastic or sapphire is employed as the window. A length of member 13 carries any convenient number of spaced conductors 11 with their electrodes 3 (e.g., as shown in FIG. 1). In addition, any convenient number of such assemblies may be run side-by-side with or without side bonding, the conductors of which are aligned with respect to one another as shown for example in FIG. 2, 2A and 2B.

FIG. 3A is similar to FIG. 3 except that 14 represents yieldable resin or other blowout substance for shock energy venting when portion 13' is transparent. FIG. 3B is similar to FIG. 3A, but having an arrow V depicting the direction of shock dissipation and blowout with, in addition, a shock sink 13'' which upon subject to explosion deforms outwardly, and being of advantage in high energy explosion for both dissipation and containment of shock energy. FIG. 3C depicts still another version of the movable enstructured conductor structure; 15 represents spheroidal or like geometry body members encasing the explodable conductor 11, having contact electrodes 3; the spheroidal geometry minimizes shock escape in all directions. These can be strung like beads for a contiguous series feeding through an exploding apparatus (as for example shown in FIG. 5), or they can be shot as projectiles when the geometry is more evoid. In FIG. 3D there is shown another enstructured conductor assembly wherein the body portion 13 is square, rectangular or of like geometry; as with the assembly shown in FIG. 3C, there are adapted to successive conductor explosions when in a single end-to-end series (as a tape or belt), or when run side-by-side (as in FIG. 1); furthermore, the structure of FIG. 3D may comprise a projectile adapted to propulsion through the exploding system shown in FIG. 5, in which case the conductor 11 and its ancillary contact electrodes 3 are realigned 90°, with the contact electrodes 3 rising to and through the opposite sides of portion 13.

Taking the aforementioned figures in connection with subsequent figures, the various embodiments, features and advantages of this invention will be better appreciated. Thus, in FIG. 3 there is shown in perspective a version taken out of FIG. 1, wherein there is arranged side-by-side, affixed or not to one another, solid, rigid or flexible cylinders comprising the matrix body member 1 having enstructured a plurality of exploded conductors 9, with exploded and unexploded conductors shown as 10 and 11, respectively. Each of the conductors 11 is space $e'$ apart from the other, and each is provided with $e$-spaced riser contact electrodes 3 adapted to close circuit with $e$-spaced firing lead members 4 and 5, shown in FIG. 4 as roller electrodes but, as detailed previously, electrodes which can be of other kinds including minimal gap sparkover electrodes; the members 4 and 5 are connected to a suitable power source, described in detail hereinafter.

FIG. 5 shows in perspective exploding means through which is passed an enstructured conductor. The exploding means comprises an assembly of guide members 19 and 20, which correspond to rails, a crib or other barrellike support and guide structure, together with electrical firing leads 17 and 18, which may be either contact type or minimal gap sparkover type, as desired, adapted to communicate an exploding surge of electrical energy via contact electrodes 3 into the explodable conductor 11 enstructured by body portion 1. In FIG. 5 the explodable conductors are aligned 90° to the long axis of member 1, as contrasted to parallel alignment in FIG. 4; the conductors 2, 11 and 10 correspond to previously described conductors, with 9 being the explosion area and L the emitted light; the contact electrodes 3 are affixed to the ends of the conductors and rise to the edge surface of member 1 so as to be in electrical communication with firing lead members 17 and 18. Arrow 8 depicts the direction of motion of member 1 and its enstructured components.

Further in FIG. 5: member 1 and its enstructured components may be flexible or rigid, and can be a belt or tape member, or representative of a portion of a projectile having a plurality of explodable conductors which is shot through the barrellike structure comprising 19 and 20. I have used the numeral 16 to emphasize the fact that the contour or geometry of the member 1 may be variable, as desired; in the drawing it is shown as biconvex; however, it may be round (in which case the inner portions of the barrellike structure 19 and 20 are rounded), plane on both faces, planoconvex (with the plane face in the direction of L, as desired); in addition, R may represent a reflector coating of say magnesium oxide, or a coating of white candoluminescent oxide, thereby to have a dual function.

FIG. 1 is a schematic perspective illustration of a phased array of explodable conductors 11, 11' and 11'' having contact electrodes 3, and enstructured in body member 21. This assembly is designed to be moved or propelled through an exploding apparatus such as that shown in FIG. 5, either as a belt or as a projectile or the like, as shown by arrow 8, with the emission of light L. Member 21 is optionally provided with a reflector R and, as desired, the roof portion of 21, as shown by 21' may contain an additive material suspended in the plastic or the like comprising 21, such as candoluminescent particles, heat responsive, light-emitting metal or pyrotechnic composition to augment light output in both quality and quantity. Firing leads 22 and 22'' are analogous to leads 17 and 18 of FIG. 5, and are connected via wires 22, 23' and 23'' to a switch S which is fed by one side of a capacitor C lead, the other lead of which goes via 24 to the firing lead members 22''. J and J' are jacks or the like so that once C is charged the assembly may be removed from the primary power supply and be made portable. The schematics of phased array conductor firing includes first the charging of the capacitor C from the primary power source, unplugging by means of J and J' when portable use is desired, all with switch S' in an open position. When the series of conductor explosions is to be started switch S' is closed while switch S is at X, causing the explosion of the conductor at X, switch S then moving to close circuit at Y, causing explosion of the conductor at Y, and the switch S then closing circuit at Z, causing explosion of the conductor at Z. The assembly 21 then moves in direction 8 to present conductors X', Y' and Z' for sequential explosion, and meanwhile switch S has moved from position Z back again to X to repeat the cycle; and so on through X''... Y''... Z'', and thence to X'''... Y'''... X'''... and so on. I prefer in the phased array explosion to explode the uppermost conductor first, i.e., 11, then 11' and finally 11''; the reason for this is that the optical pathway in 21 is less likely to be marred as a result of previous explosions. The schematic circuitry shown in FIG. 6, including switch S, S', capacitor C, and the leads 23, 23'', and 23' to one side of the bank of conductors, and the lead 24 (split three ways into 25, 25' and 25'') to the opposite side of the bank of conductors, corresponds to multichanneled delayed wire exploder units known in the art, the circuitry and electronics of which is not deemed necessary of detailed description here (an example is to be found in Chace and Moore, vol. 1, cited previously, at page 315 et. seq.).

FIG. 7 shows in perspective an embodiment of this invention wherein there is a spinning rotor enstructuring body member 26 having a shank or drive member 27 typically powered by an electric motor or other similar engine; members 26 and 27 may or may not be of the same material and, as desired, member 27 can extend through the axis of 26 to provide stability and strength and, when made reflective on its surface, comprising a reflector (in which case the surface of 27 extended through the axis of 26 can be optically faceted, i.e., comprise a plogon after the manner of the rotating drum mirror of the high speed camera) in any event, the substance of 26 is dielectric, transparent and shock constraining, having features which are consistent with my discussion for the previous figures set out herein. Members 26 and 27 can be of cast plastic, of one-piece make; 26 can be a plastic or a materials combination sleeve member adapted to fit into and engage 27; or, member 26 can be a filament wound structure of plastic and glass, silica or like filaments, the components having matched refractive indices for isotropicity (transparency), which filament wound structure is also applicable to projectile and other enstructuring member construction. Typically, the glass content may be approximately 60 percent by volume; this would amount to a glass content of about 80 percent by weight and, based on an assumed value of 250,000 p.s.i. (pounds per square inch) against the stated strength of 100,000 p.s.i. for the fiber, would yield a cylinder having an ultimate girth strength strength of 100,000 p.s.i. and a density of 0.072 lb./in.$^3$; typically, hoop tension values for unidirectional and helical windings are 155,000 p.s.i. and 110,000 p.s.i., respectively; both net analysis and homogeneous material analysis are applied to loading problems involving filament would structures.

Further in FIG. 7: with body member 26 there is embedded a common electrode 28 here shown as a metal disk, having an electrical conduit 29 tapping one polarity of the power source (or ground) through member 27; affixed say radially about the periphery of 28 are the ends of a plurality of explodable conductors 30, the opposite ends of which are affixed to individual contact electrodes 31 like 30 being embedded and spaced within 26, but rising to the surface of the end of 26 (as desired, flush with the surface, slightly protruding or slightly recessed). Juxtaposed at the end of 26 and aligned with member 31 is what I term a "stator" assembly, which comprises an insulating sleeve member 32 with a firing lead member or electrode 33 set to close circuit through the explodable conductor 30 by minimal gap sparkover; 33 leads to the opposite side of the power source; the minimal gap is shown as G and the electrical conduit as 34. At 35 there is shown a contrarotating apertured drum having slits or other apertures 36; optionally, and depending upon the synchronization between member 26 and member 35, a portion R of the drum may be made reflective; as apertures 36 various choices can be made, depending upon the embodiment, including parallel or angular slits, Nipkow, and the like, this arrangement provides for a good deal of latitude in choice and design of a given embodiment when, for example, velocity sieving is all important; L depects the light emitted by the explosion of the conductor 30.

Figure 8:
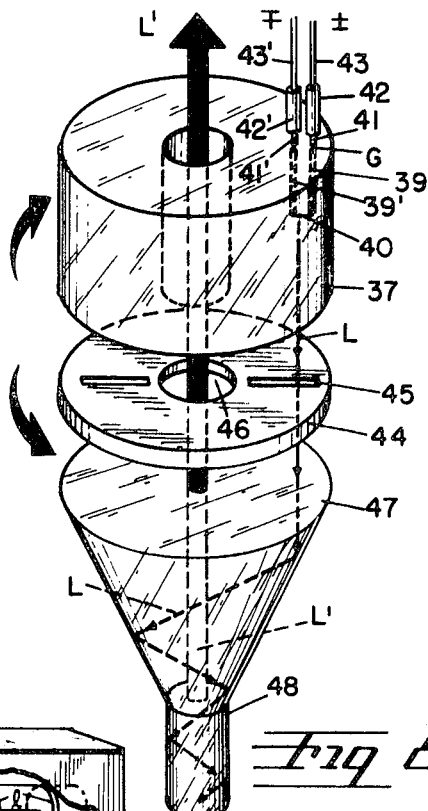
FIG. 8 depicts in perspective an embodiment including disk enstructured explodable conductors in combination with a laser resonator.

Another embodiment is shown in perspective in FIG. 8 wherein: there is a disk rotor member of the enstructuring type 37 having in the arrangement shown a central hole 38 (this is optional); enstructured within 37 is an explodable conductor 40 having a affixed to its ends electrical contact electrodes 39 and 39', these rising to the surface of disk 37 as previously described. The power supplying stator assembly is made up of two firing electrodes 41 and 41' having insulation sleeves 42 and 42' and leads 43 and 43' to the power source. The light from the conductor is L and the minimal sparkover gap is shown as G. The arrangement of a plurality of explodable conductors 40 within member 37 can be varied from simple radial to concentric circular to outwinding spiral, as desired; in these instances the stator firing assembly is not in a fixed position, but is carried upon a laterally movable arm (with respect to the plane of the disk surface) so as to be adapted to follow the series of explodable conductors and sequentially close circuit therewith.) Likewise, an edge-exploded arrangement can be used; thus, the stator assembly is mounted at the edge of the disk 37 which has the contact electrodes 39 and 39' communicating with the surface of the edge of 37, the explodable conductor 40 being affixed between and at 90° to the plane of the disk surface; as in minimal gap sparkover and like electrical exploding electrode arrangements, the two electrodes are conveniently spaced a distance the same as the distance between the contact electrodes 39 and 39', other things being consistent with good electrical insulation so as to minimize arcing.

The means for rotating disk 37 shown in FIG. 8 is, for example, a three-bearing frictional drive at the edge of 37; or, the edge of the disk 37 can be notched and driven by a toothed wheel; or, when the light emitting system is employed without the laser resonator I have shown, and described below, the disk can be spun by a drive shaft inserted into hole 38 or by a drive shaft engaging the disk at its center.

In FIG. 8 I have shown a laser resonator system in combination with an exploding conductor pumping light source, just described; member 44 represents a contrarotating (or as desired, phased corotating, also applicable to the same element in FIG. 7) apertured disk having slits or other windows 45 (45 may carry filters, lenses, etc.), and a center light exit hole 47; the disk is mounted so that the apertures optically couple with the light L given out by the explosion of a conductor. The laser resonator can be the usual elongated right cylinder or other type; however, I prefer optical coupling with the cone face of the so-called "trumpet type" resonator having a sapphire (or glass) cone 47 integral with or optically coupled to a ruby (or doped glass resonator shank member 48 having an end reflector 49. In FIG. 8 the optical pathway is shown schematically as L (pumping light) passing through the synchronized apertured disk 44 into cone member 47, and thence by internal reflection into resonator member 48, where stimulation takes place, the laser beam L' finally passing from the resonator and optically unobstructed through the succession of holes 38 and 46.

Figure 9:
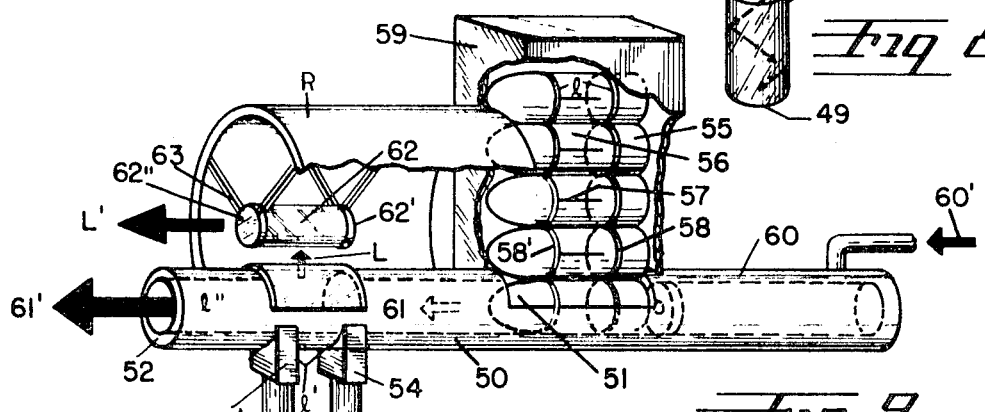
FIG. 9 shows in perspective an exploding conductor light producing system including a gun and high velocity projectiles carrying explodable conductors, together with an irradiable target such as a laser resonator.

Yet another embodiment of this invention is perspectively illustrated in FIG. 9, wherein: there is a barrel 50 having a breech portion 51 and a muzzle portion 52; at a point say midway along the barrel (or substantially near the muzzle end) there is a window or aperture 53, which may be open or windowed with transparent material such as silica or clear sapphire; mounted beneath or to the side of the window 53 are spaced electrical firing electrodes 54 and 54' adapted to close circuit with a projectile carrying an explodable conductor when that projectile passes down the barrel and past the window 53. I have shown the projectile or bullet as 55, typically comprising an enstructuring body portion 56, of nature previously described and conveniently of matched refractive index filament wound structure, with an explodable conductor 57 enstructured therein member 56, the conductor 57 having contact electrodes 58 and 58'; the latter I have shown as metal disks in communication with the surface of member 56, disks being preferred for structural strength and ballistic balancing; as I have described in connection with velocity sieving or the parting of shock from light energies by taking advantage of the velocity differential, the projectile 55 is preferably adapted to propulsion through the barrel 50 at velocities in excess of Mach 1 o the speed of sound; 1 equals 1' in the drawing, which represents the distance between 58 and 58' and the distance between 54 and 54'. As the bullet 55 passes between 54 and 54' and the light from the conductor explosion is optically coupled with window 53, that explosion is created by minimal gap sparkover which acts to close the circuit through the explodable conductor 57 of the bullet 55. At the breech portion 51 there is provided a magazine or chamber adapted to hold a plurality of rounds of bullets 55, these for firing at any convenient rate; the breech 51 is integral with the firing mechanism 60, which is typically a pressurized gas mechanism having an optional inlet 60' (or including a pressurized gas cartridge); the firing mechanism may be of any convenient kind, and many such kinds are well known in the weapons art, so a detailed description is deemed unnecessary here; suffice it to say, however, that I prefer a projectile propulsion capability for 60 which includes both firing at a high rounds-per-minute (or other unit of time in this instance) and high bullet velocity. As is evident, in certain applications of this invention, as in laser weaponry, it will be desirable to embody as breech 51 and its ancillary firing mechanism 60 the mechanics of the automatic weapons art, using a projectile having a chemical explosive leaded cartridge. I have shown the unexploded projectile starting on its journey by arrow 61, and the exploded projectile exiting from the muzzle 52 by arrow 61'; the disposition of an exploded projectile can be by absorption into a suitable target, free flight dumping when this is not objectionable, or the like; as desired, the muzzle 52 is equipped with a Maxim silencer or like anechoic or sound reduction device.

Further in FIG. 9: as the conductor bearing projectile 55 passes down through the barrel 50 it is caused to explode by minimal gap sparkover closing of the circuit through the conductor 57, to release a pulse of light L which then passes through aperture or window 53 and on to an irradiable target such as a laser resonator 62. In FIG. 9 the laser resonator is of rod form, having an end mirror 62', and aligned long axis parallel to the long axis of the barrel 50; the laser 62 has an exit end 62'' from which is released the laser beam L' upon pumping by light L; the laser resonator 62 is conveniently mounted by supports 63 upon the inside wall of an elliptical reflector R in a manner so the optical pathway of reflected light from R is least obstructed.

Further in FIG. 9: as the conductor bearing projectile 55 passes down through the barrel 50 it is caused to explode by minimal gap sparkover closing of the circuit through the conductor 57, to release a pulse of light L which then passes through aperture or window 53 and on to an irradiable target such as a laser resonator 62. In FIG. 9 the laser resonator is of rod form, having an end mirror 62', and aligned long axis parallel to the long axis of the barrel 50; the laser 62 has an exit end 62'' from which is released the laser beam L upon pumping by light L; the laser resonator 62 is conveniently mounted by supports 63 upon the inside wall of an elliptical reflector R in a manner so the optical pathway of reflected light from R is least obstructed.

While I have shown in FIG. 9 the magazine 59 as a top loading clip. I do not wish to be limited by this particular form, as is the case already mentioned for the firing mechanism 60; thus, the magazine or loading means may be side-entering clip, rotating drum, or side-fed belt, after the manner of contemporary and well known automatic weapons. For the more simple utilizations of this embodiment a single shot breech and firing arrangement can be employed, with manual reloading. For rapid fire versions, shock and vibration absorbent padding and like elements are used, also recoil takeup structure after the fashion of the gunnery art.

Figure 9A:
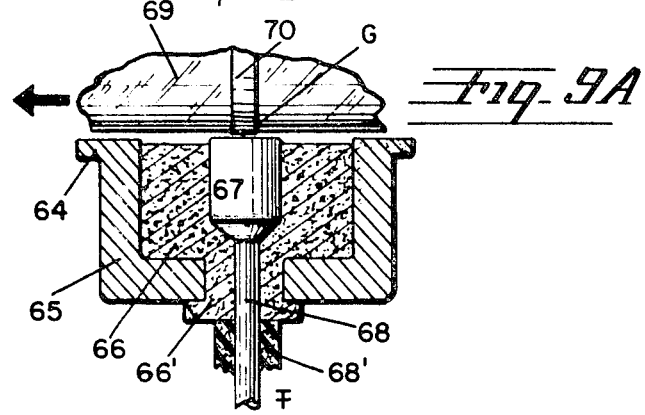
FIG. 9A illustrates in side elevation certain of the detail in FIG. 9.

FIG. 9A shows in side elevation further details of the electrical firing electrodes or circuit closing electrodes 54 and 54' that are conductor-exploding power source fed, taken from FIG. 9, wherein: 64 is a portion of the gun barrel and 65 is the housing for the circuit closing electrodes or electrical firing electrodes, with 66 representing insulation and 66' a grommet also of dielectric; the circuit closing or firing electrode is depicted as 67, having attached thereto a power source cable 68 provided with insulation 68'. Residing above member 67 and adapted to minimal gap sparkover close circuiting is projectile enstructuring portion 69 having in communication with the surface of 69 and circuit closing communication with member 67 an electrical contact electrode 70 previously detailed as flush with 69, recessed from 69, or slightly protruding from 69, it being noted that I prefer the former two from the standpoint of integrity of propellant-to-barrel wall seal; G, again, is the minimal gap sparkover circuit closure which results in the explosion of the explodable conductor.

Now having detailed and described this invention in its various embodiments in view of the drawings, the following information is to be taken in conjunction with the same so that the numerous and varied advantageous features and novelties of this invention are better appreciated.

The means for moving an enstructured conductor will vary with the particular form of this invention, and variations are well within the choice of those skilled in the art. In the case of moving belt, tape or like assemblies, the body member 1 as in FIG. 1 can be frictionally or notch engaged by a variable-speed toothed wheel driven by an electric motor; or, when flexible members are involved, motorized upwinding onto a takeup spool from a supply spool; or, when short rigid lengths of enstructured conductor is fed linearly and rate of feed is not overly critical a simple gravity drop can be employed, weighted or unweighted as desired. In the case of spinning disks and cylinders the conventional gear and bearing drives are preferred, with high speed motors and so-called frictionless bearing employed when extremely high rates of firing are desired; likewise, gas and air turbine motors are to be used, after the well-known fashion of the mechanical elements employed to drive the rotating drums and mirror cylinders of high speed and ultrahigh speed cameras; and the like.

In propelling one or a number of rounds of light emitting explodable conductor projectiles I prefer to rely upon the automatic weapons art with high pressure gas as the propellant. There are a good many of these systems known, and since they are within the skill of the artizan they are not deemed necessary of detailed description here. When, however, it is desired to impel a light emitting projectile both at very high firing rates and at several or more Mach number velocities automatic weapons-type feeding, as for example machine gun ammunition canister or belt ammunition feedings are used; chemical explosive propellant is then used, and the projectile, usually cylindrical, merely replaces the conventional metal bullet in the cartridge case which contains solid propellant, e.g., black gunpowder or other suitable explosive, and the usual primer for firing. It is noted that modern automatic weapons are rated as high as 6,000 r.p.m., as in the case of the electric-Gatling gun or the Gatling-Vulcan gun, which guns are multiple barreled.

Depending upon the modification the matrix or sheath member for the explodable conductor may be of a single material or composite involving several materials. The common properties of dielectric strength and substantial transparency apply to all choices, except when the materials are chosen for structural strength and reinforcing qualities per se. Examples of matrix materials include various plastics, high-strength and impact-resistant and tempered glasses, and such other materials as fused silica and machined quartz crystal. In the case of plastics and glasses additives such as colorants may be included for the purpose of blocking a given portion of the spectrum. Likewise, the exterior of the matrix member can be layered, coated or similarly treated with filtering media, as for example infrared and/or ultraviolet absorbent materials to cut down the heat released but still pass other portions of the spectrum.

Following are typical plastics which can be employed singly and/or in combination with heavy-duty, tempered glass, silica, ceramic, machined quartz crystal, sapphire, and like materials; in certain instances the choice may be based upon the refractive index and secondarily upon tensile strength, and vice versa; in the case of dielectric strength it is of course preferred that the value be as high as possible; in the case of "transparency," I mean by this term not only visible-clear, but also ultraviolet and/or infrared clear (which may or may not involve visible clarity) in the manner of a band-pass filter:

| Matrix | Refractive Index | Minimum Tensile Strength (p.s.i.) |
| --- | --- | --- |
| Polyamides | 1.53 | $12-15 \times 10^3$ |
| Epoxy | 1.58 | $10 \times 10^3$ |
| Polycarbonate | — | $9-10 \times 10^3$ |
| Acrylic | 1.485–1.500 | $9.10 \times 10^3$ |
| Polystyrene | 1.585–1.600 | $8.9 \times 10^3$ |
| Polystyrene (impact) | — | $5.6 \times 10^3$ |
| (Tempered glass) | 1.456–1.574 | up to $10^4$ |

For composite matrices, e.g., sheathed, vented, light-pipes, where refractive index is of paramount interest, a number of so-called "plastic glasses" can be employed, as for example (refractive index in parenthesis); vinyl carbazole (1.683); lead methylmethacrylate (1.645); 2,6-dichlorostyrene (1.623); vinyl phenyl sulfide (1.657); p-divinyl benzene (1.615); o-chlorostyrene (1.609); a-napthylmethylmethacrylate (1.641); vinyl napthalene (1.682); and the like. These are refractively matched with the host material comprising a solid state laser resonator, according to the art. Other optical plastics and their refractive indices can be found listed in the article on "Plastic Glasses" by H. C. Raine, Proceedings of the London Conference on Optical Instrumentation, p. 243(1950).

In this invention I can employ what I believe is a broadly novel advance, that of "velocity sieving." This expression designates the method and means of separating the usable electromagnetic wave energy from the unusable and target insulating shock or mechanical energy, created simultaneously in an exploding conductor, by virtue of the two velocity differences. Thus, light energy has a constant and high velocity of 186,000 miles/sec., whereas shock energy has a much less and variable velocity, depending upon the system and conditions involved, and ranging upwards from about 1,000 ft./sec. to several or more Mach numbers. In velocity sieving the explodable conductor is moved at a speed which allows light to reach an irradiable target while the slower shock energies are carried away from the field of the target by the displacement of the explodable conductor.

Thus, taking FIG. 9 as a homely example: If $1+1'=1''=1$ in., with the conductor carrying projectile moving at approximately Mach 5 or 5,000 ft./sec., the conductor resides for explosion at the aperture corresponding to $1'$ for approximately 15 $\mu$sec., with an additional 15 $\mu$sec. lapse in portion $1''$ of the barrel before leaving the muzzle. If the conductor length $1$ is but one-half of this, then the total lapsed time for passage through portion $1'+1''$ is about 15 $\mu$sec. By cutting $1''$ completely off and by stopping down or reducing the aperture size to say 0.3 ind. or less the time constant can readily be reduced to 5 $\mu$sec. or less. With higher Mach members an added reduction is of course to be had.

It is noted that in FIG. 9 the long axis of the conductor is parallel to the long axis of the barrel. By simply realigning the conductor 90°, and appropriately readjusting the aperture, and repositioning the firing leads, as in FIG. 5 and 6, the realm of the fractional microsecond is then attained. When this system is employed to pump a laser resonator, such as a rod, it is also suitably realigned. Using FIG. 5 again as an example, if projectile enstructuring body 1 carries say 10 spaced conductors, one then can fire at an extremely high rate of speed and within a very brief period deposit tens of kilojoules of energy into the exploding sequence.

It is thus by velocity sieving that shock energy can be parted from the light burst: that is, the conductor in projectile form is moved at a velocity such that it presents itself to the target with virtually instantaneous release of light while the projectile carries its now building shock energy from the target field and into a nontarget area where the shock can be harmlessly released, as by rupture of the projectile, if need by, after it leaves the muzzle of the apparatus.

Velocity sieving is of the most value when conductors enstructured in projectile body members are to be fired at extremely high rates. This high rate may be in excess of 500 r.p.m., as is well known to those versed in the automatic weapons art; however, for most applications of this invention a much lower firing rate will suffice. It is quite evident that high firing rates are of much interest in such applications as the directed energy and radiation weapons field, for antipersonnel and defense and antiweapons problems, including those in outer space, where destructive energies of very great magnitudes are desired.

It is also evident from conductor-matrix assembly inertial and velocity considerations, as well as those of friction, that shock-light parting by velocity sieving either is not attained or is not desirable for simpler and less dynamic exploding conductor systems where the conductor displacement rate (linear, plane rotational, spinning, etc.) is far less than that necessary or able to carry off shock energy via the moving matrix member.

Velocity sieving is applicable to a rotating enstructured conductor (spinning as a disk, as a cylinder, or as geometric variations of these such as a polygonal cylinder), with and without field or aperture stopping down, to permit higher energy depositions and/or shorter explosions at greater displacement rates. As in the case of the projectile example, supra, I prefer that the matrix or body member be a composite structure with a substance such as heavy-duty glass, sapphire or silica as the first surface laminate or enveloping element. The hard, almost zero creep glass or like envelope of the spinning conductor assembly provides mechanical stability and strength for high rotational speeds, as contrasted to flowable and deformable body solid such as plastic which first undergoes dynamic imbalancing due to stress induced variations, and then imbalancing due to weight variations induced by unexploded-exploded conductor arrays, and, finally, rupture when the centrifugal force exceeds the elastic limits of the medium.

The efficiency of velocity sieving can be increased by delimiting the conductor explosion area; that is, by stopping down the aperture through which the light passes. With a split aperture and an exploding wire the width of the slit may correspond to from one to several wire diameters and the slit length may be of wire length or less for both projectiles and whirling conductor assemblies, as may be desired and dictated by the particular end use of this invention. Likewise, for enstructured exploding films and foils, as well as enstructured implosion conductors the aperture size is considered together with the displacement velocity.

In such modifications of this invention where velocity sieving is not desired or is not feasible, as in the case of the relatively slower moving conductor assemblies of FIG. 4 and 5, and in special geometry versions, the dynamic load undergone by the enstructuring enstructuring member may be controlled or minimixed in one or more of several different additional ways. These include: (a) control of the size of the explodable conductor, e.g., by use of very fine wires or thin films; (b) control of the power surge through the conductor, as by dropping the voltage; (c) increasing the size of the matrix member, e.g., in radius in the case of a cylindrical assembly; (d) selection of high tensile strength matrix material and combinations thereof; (e) the use of composite matrix structuring, e.g., plastic and high strength glass laminates, also by the use of glass fiber or tape winding, as well as by the use of plastic containing silica or glass fibers embedded within it; (f) by the use of implosion or explosion-implosion conductor arrangements, as explained elsewhere herein; (g) by providing shock energy excapements such as by venting, also described elsewhere herein., (1) making the matrix wall not in the direction of the target, e.g., laser resonator, thinner than that through which the explosion-derived light passes so as to provide a breakaway escapement and hence a venting of the shock energy, (2) providing a composite sheathing assembly of high strength glass or silica tubing having a core filling of yieldable plastic axially through which runs the explodable conductor, with or without the backside of the outer tubing provide with slits, holes or the like through which the core substance is in some instances literally squirted from the exploding conductor with concurrent lessening of the dynamic load in the direction of the target. An example of a number of possible variations is a conductor-carrying matrix-member tube of "T" geometry; the top or head of the "T" carries the explodable conductor within, which is of length approximately the diameter of the leg of the "T" and positioned just above that leg, the leg being of larger caliber than the top, as desired; this whole assembly can be filled with thermoplastic resin. (h) In addition, particularly in the case of bulletlike conductor assemblies propelled through a barrel or of spinning disk or similar assemblies the linear or rotational speed may be of a very high value, such that an exploded conductor has wholly or partially passed from the field of emission before breakage, crazing or other mechanical damage has occurred in the matrix member. It is noted that cracking, crazing, rupture and the like may partially occur without diminishing the effectiveness of this invention for many applications.

The dynamic load placed upon the matrix member by an exploding conductor is difficult to analyze, particularly when implosion or combined explosion-implosion phenomena are involved, and the best measure of toughness is in end use; with composite matrix members and those involving venting the problem becomes more complex. However, for general guidance the von Mises-Hickey yield condition can often be profitably applied to plastic matrices:

$$(S_1-S_2)^2+(S_2-S_3)^2+(S_3-S_1)^2=2S_{Tt}2$$

where $S_1$ is the hoop stress; $S_2$ is the longitudinal stress; $S_3$ is the radial stress; $S_{Tt}$ is the yield stress in tension at the time of failure. According to the theory for a homogenous pipe, the yield stress in tension at the time of failure equals the hoop stress time $\sqrt{3}/2$. For a closed end tube with thick walls, the equation giving the allowable pressure is:

$$P_i=(2/\sqrt{3}) S_{Tt}\log_{10}R/r$$

where $R$ is the external radius; $P_i$ is the internal pressure; $r$ is the internal radius; $t$ is the thickness.

The explodable conductor (or explodant) is typically a wire of small cross-sectional diameter, and large surface area, e.g., ranging from several tenths of a mil in diameter to several tens of mils in diameter; in addition, the filamentous conductor may be of cross-sectional geometries other than circular, as for example, square, triangular, flat. These may be straight, coiled, zigzag or of other convenient configuration taken in a linear sense. Moreover, the conductor may be solid (coated or uncoated; laminated, sandwiched or not) or hollow (also coated or uncoated; laminated, sandwiched or not). In the case of composite conductors an assembly or more than two conductor materials can be used for dilating the output frequency range. The conductor can be of any convenient length, e.g., from several tenths of an inch to several inches, depending upon the modification and the deposited energy.

As the explodant, a thin film or foil of metal or other suitable substance can be employed. For example, in thicknesses ranging between several tens and several thousandths of Angstroms. These are put down upon a suitable substrate, e.g., silica, sapphire, glass, plastic, by chemical deposition, vacuum evaporation or the like. They may be of any convenient dimension: a typical explodant metal film is 200 A. thick and is approximately one inch in width and two inches in length. This film is exploded along its length by the deposition therein of electrical energy supplied, for example, by a power source made up of a 1.4 mf. capacitor charged to voltages ranging between 1,500 and 5,000 volts.

The light-producing explodable conductor may be of an imploding type with or without an exploding conductor operating simultaneously. A typical implosion conductor member is a hollow cylinder or tube the inside surface of which carries the implodant in the form of a film or thin metal foil. When electrical energy is poured into the implodant an implosion takes place. As desired, an axial explodable conductor, e.g., a fine wire, may simultaneously receive an electrical energy deposit sufficient to cause it to explode. A typical arrangement includes a cylinder 0.5 inch in diameter and one inch in length; the inside wall is coated with implodant conductor material of thickness ranging between approximately 50 and 500. The electrical energy is supplied at the ends of the cylinder, as by means of annular ring or disk contact electrodes, causing uniform energy deposition and an inwardly collapsing shock wave. One of the manifest features of the implosion type of conductor is that the shock insult is lessend for the surrounding environment. With this arrangement an exploding insult is lessend for the surrounding environment. With this arrangement an exploding circuit includes a 1 mf. capacitor charged by a transformer, e.g., 10 to 40 kv.

The choices of conductor material include pure metal or conductive elemental substance, alloys including amalgams, and composite assemblies. In the latter instance these can be braided or twisted wires, also stacked or laminated foils or films, or coated conductors (e.g., surface amalgamated for enhanced explodability). Core filled conductors are preferred for highly reactive substances, for ease of fabrication, and for substances which are selected for emissivity compositional qualities. For example, microtubes filled with fine (often pyrophoric) metal powders or reactive metals, nonmetals, or metalloids; also, various allotropes, e.g., phosphorus, carbon, selenium; also, solid compounds carrying one or more elements of particular spectral interest, e.g., hydrogen and deuterium alloys with metals, deuterohydrates, field valency hydrides or deuterides of iron or nickel, or the so-called saline compounds of hydrogen or deuterium and metals of the first, second and third chief subgroups of the periodic system which give solid, colorless hydrides or deuterides, viz, all of the alkali metals, the elements calcium, strontium and barium of the second group, and the rare earths of the third group.

As explodants of pure materials I prefer elements selected from the periodic system, as follows: Group IA (Li, Na, K, Rb, Cs); Group IB (Cu, Ag, Au (which metals give better explosions when surface amalgamated with mercury)); Group IIA (Be, Mg; Ca, Sr, Ba); Group IIB (Zn, Cd, Hg); Group IIIA (B (B(which has good conductivity after the initial resistance heating which occurs or when it carries traces of carbon), Al, Ga, In, Tl); Group IIIB (Sc, Y, La); Group IVA (C, Si, Ge, Sn, Pb); Group IVB (Ti, Zr, Hf); Group VA(P, As, Sb, Bi, N as nitrides or the like); Group VB (V, Nb, Ta); Group VIA (sulfur and oxygen as compounds, Se, Te); Group VIB (Cr, Mo, W); Group VIIA (the halogens as compounds); Group VIIB (Mn, Re), Group VIII (Fe, Co, Ni, and the platinum metals); and, in particular for laser pumping because of their many well-defined spectral lines the lanthanides (Ce, Pr, Nd, Sm, Eu, Gd, Tb, Dy, Ho, Er, Tm, Yb, Lu) as well as the actinites (Th, U(and for specialty research and investigational utilizations the transuranium elements)).

It is noted that the explodable conductor can be alkali metal, e.g., potassium, sodium, cesium, in pure form alloyed with another alkali metal, or amalgamated with mercury. In this embodiment I prefer that the alkali metal explodant be carried in fine glass or silica capillary tubes which are in electrical communication with the electrode members. I point out that when such explodable conductors are employed, the active species in the case of the laser resonator may be of the same or similar alkali metal for increased efficiencies; for example, a cesium vapor laser is stimulated by light from a mercury arc; I refine and extend in this invention by the use of a cesium-mercury alloy(amalgam) explodable conductor which provides pumping energies derived from both mercury vapor and cesium vapor. If an implodant alkali metal conductor is desired, the implodant material is layered onto the inside surface of a glass or other suitable substrate, as described above.

As explodable conductor adjunctives I prefer to use candoluminescent solids in that these materials markedly depart from the usual black-body temperature radiation relationships and exhibit a much higher optical temperature, i.e., a light output that is hundreds to tens of thousands of times that of a black-body at the same temperature. These are utilized not only for enhanced light emissivity, including spectral regions peculiar to the substance, but also for the transduction of otherwise wasted ultraviolet thermal and plasma electron energies (in the latter instance exhibiting cathodoluminescence) inherent in the exploding conductor phenomenon. Candoluminescent (which are usually cathodoluminescent) solids can be coated upon the conductor; the conductor may be hollow and core filled with the additives; and/or, in the case of implodable conductors, surface coating (both internally and externally to the film or foil), or lightly packed into the implosion cavity. In addition, the matrix member material can carry embedded particles, microbeads, candoluminescent fabric (after the manner of a Welsbach mantle), or candoluminescent fibers (in this instance suitable choices provide strengthening of the matrix). The concentration of these additives or adjunctives can be of any convenient value, 50:50 being a typical value when the candoluminescent solid is carried within the plastic matrix substance.

Candoluminescent solids, like cathodoluminescent solids, are generally of two kinds: pure and doped or activated (the latter sometimes being identical with known laser resonator solids). The substances are mostly oxides but may be silicates and alumino silicates from Group II, and the even series of Groups III, IV and V of the periodic system, as for example: Group II (oxides of Be, Mg, Ca, An, and to a lesser extent Ba and Sr); Group III (oxides of B, Al, Ga, and the rare earth elements); Group IV (oxides of Si, Ti, Th Zr, Hf); Group Group V (oxides of Nb and Ta). Examples of doped solids include ruby, rare earth-doped calcium fluoride, and tantalum oxide-doped niobium oxide. The $Nb_2O_5$:Ta system, for instance, releases more than $85 \times 10^3$ times the expected temperature radiation at 0.450 $\mu$; the value for ruby is $1.5 \times 10^3$ for the same spectral region; among the rate earths erbium oxide, $Er_2O_3$, is a notable emitter. The emissivity characteristics of these materials is the same or very similar to the banded spectra produced when the same substance is excited by X-rays, ultraviolet light, or by electron rays.

The power source or electrical feed energy for the explodable conductor assembly is usually a high voltage transformer and one or more capacitors. A number of such systems are well known and can be found described, for example, in the Chace and Moore tomes cited previously. Generally there is a switch in one lead from the capacitor bank, this usually being thyratron, trigatron or three-electrode. It is desirable that all of the bus work be designed for minimum inductance consistent with the maximum voltage employed. The circuit functions by charging the capacitor bank to the desired voltage with an adjustable voltage supply. The energy in the bank is:

$$J = \tfrac{1}{2}CV^2$$

where J is the energy in joules (or watt-seconds); C is the bank capacitance; and V is the bank voltage.

Since the stored energy varies as the square of the voltage, it is usually advantageous to hold the capacitance constant and vary the voltage to change energy levels. When the capacitor bank is charged to the desired voltage level a switch between the capacitor bank and transformer disconnect the power supply from the capacitor bank. This is done as a safety precaution to prevent any of the stored energy from getting back into the high voltage power supply. The energy stored in the capacitor bank is then discharged through say a three-electrode switch-gap in which the middle electrode acts as the trigger, the energy then being transmitted by say a coaxial cable to the firing members and through the contact electrodes and thence through the explodable conductor.

A number of modifications of this basic elementary circuit can be employed in the present invention, depending upon the modification and embodiment. These range from single shot electrical pulses to multiple transformer-capacitor banks to various designs of multichannel delayed exploder units. Likewise, specialty feed energy circuits and components can be employed. For example, the entire explodable conductor system can be made portable simply by making the transformer detachable from the capacitor bank and its connected firing leads and the firing electrode-explodable conductor assembly. This modification is of special interest in military and weaponry applications of the present invention. Furthermore, the system may be automated or designed for remote firing upon command by a suitable signal such as a radio signal; these versions are of particular interest in weaponry as well as in space applications of the laser light beam. While a direct current transformer is generally employed, fed from conventional power lines, the electrical energy may, as desired, be derived from nuclear energy power sources such as the SNAP or other so-called atomic battery sources of power.

Multiple transformer-capacitor banks can be used when rapid recharging and/or use of the stored energy is necessary, as in the case of a fast moving belt or series of projectiles each carrying explodable conductors. In some instances, again as desired, only a part of the stored energy will be used in the explosion, e.g., with fine wires and thin foils or films, so that the conductor behaves as a fuse in an individual firing to leave sufficient power in the capacitor bank for subsequent firings. As is set out elsewhere herein, it is evident that the energy deposited in the conductor may vary over extremely wide ranges. In the case of explodable wire 5 mils in diameter and 0.5 inch in length the explosion is induced by energy deposition therein from a 2 $\mu$f. capacitor charged to voltages ranging between 800 and 700 volts, using a thyratron switch. These values are illustrative and range commensurately downward for so-called "whiskers" and films. At the other end of the energy spectrum, for high energy depositions and vented and/or thickly sheathed conductors with the irradiable target placed a substantial distance away so as to minimize damage from shock energy that may escape or from partial shock constrainment but shattering of the matrix member the power supply may comprise an 8,000-volt transformer feeding 16 50-$\mu$f. capacitors, the transformer being fed by 3-phase, 60 cycle, 220-volt line. The output is in the range of 800 to 8.000 volts, having a maximum energy storage of approximately 25 kilojoules and an average power of about 10 kw. Advantageously, the light from the electrically exploded conductor can be modulated. Typically, light modulation is accomplished by: (a) the employment of phased conductor arrays or multiplexed explodable conductors; (b) the use of phased array or multiplexed conductors in varying compositional sequence; (c) the use of phased array or multiplexed conductors of varying structural sequence to provide a particular profile of light bursts; (d) by selective aperturing; (e) by use of filters; and so on. Thus, the use of phased array and multiplexed conductors is illustrated in FIG. 2, 2A and 2B, as well as in FIG. 6; the use of phased array or multiplexed conductors in particular compositional sequence is illustrated by my detailing of the numerous choices available for explodable conductors; the use of phased array or multiplexed conductors to provide a given profile by size and structural and geometrical variations, including implodants, with or without variations in deposited energy, make for an extremely large number of combinations and variations; and the like. Once created the light may be modulated by such additional and conventional methods and means as electro-optic and electromagnetic shuttering.

The laser (optical maser, uvaser, iraser—as it is also called) light wave generator (also termed cavity, active species, resonator or the like) may be solid, liquid or gaseous or combinations thereof, as dictated by pumping energy requirements and the particular modification of this invention. A number of such coherent and near coherent laser resonators are well known in the art and they are increasing very rapidly in number and complexity, ranging from simple rods which are usually pumped through the sides and having optically parallel ends (e.g., 100 percent reflective on one end and a few or zero percent mirroring on the opposite end), confocal ends, one fresnel end, or the like; also cubic prismatic, hexagonal and like configurations (taken cross-sectionally); also, fiber optic assemblies light-piping the pumping light into the lasing active species; also, composite systems such as ruby overlaid with sapphire usually side pumped) or the same of gadolinium-doped or neodymium-doped or ytterbium-doped glasses overlaid with glass (also usually side pumped), as well as trumpet or coned assemblies made of a shank member carrying the active species and a cone or trumpet end of sapphire, glass or other material, depending upon the particular resonator involved (pumped through the cone face, usually full mirrored on the end of the cavity shank).

The laser light wave generator can be optically coupled to the pumping light originating in the exploding conductor by simple, straight line optical alignment of the two members or systems. Thus, the laser member, for example, may be juxtaposed parallel to the long axis of the explodable conductor and set out from that conductor a short distance; or, the laser may be ringed or semiringed with explodable conductors arranged in the same fashion. For increased pumping efficiency I prefer to place the laser member and the explodable conductor at the foci of an elliptical cavity lined with a highly reflective material, e.g., MgO. The cavity wall reflects light from the exploding conductor and focuses it on the laser. When the explodable conductor is relatively small in length as compared to the cross-sectional diameter of the laser rod, cube or other input face the laser may be provided with a trumpet-shaped end or side into which the explodable conductor light is poured. An example is the ruby-sapphire crystal grown in this form, reducing pumping power requirements to about one-tenth of the usual values and providing lasing of greater duration. Other arrangements are within the skill of the art and can be suitably chosen as the modification requires.

What is claimed is:

1. A circularly rotatable upon the long axis, light-emitting electrically explodable conductor assembly which comprises a phased array of peripherally spaced explodable conductors embedded within a cylindrical, transparent and blast-resistant body member characterized as a dielectric solid having transparent window portions optically coupled to the said explodable conductors, and electrical contact electrodes affixed to the ends of the said spaced explodable conductors and rising to the top and bottom surfaces of the said cylindrical body member, whereby upon passage of the said assembly between spaced electrical energy exploding electrodes connected to a source of electrical energy the circuit is closed through the said conductors with the explosion in phased array of same, and means for rotating the said conductor assembly upon its long axis so that said electrical contact electrodes are sequentially connected to said electrical energy electrodes so that sequential bursts of light are emitted from said exploding conductors.

2. An exploding conductor system for the generation of laser light pulses which comprises the combination of laser generator optically coupled with a rotatable cylindrical body member of transparent, dielectric shock constraining solid having a phased array of explodable conductors embedded therein, each of the said conductors having a pair of electrodes in communication with the surface of said cylindrical body member, each of the said conductors and its electrodes being dielectrically spaced apart from the others within the said body member; an electrical energy source adapted to explode the said conductors, said source being switchably connected with circuit closing lead members positioned to close circuit with the said electrodes and through the said conductor; means for rotating the said body member and enstructured explodable conductors and electrodes such that the electrodes successively close circuit with the said circuit closing lead members, whereby to induce explosion in the conductors in phased array and concurrently constrain the shock energy while releasing the light generated in the said explosion to the optically coupled laser generator, whereby to generate the said laser light pulses.

* * * * *